United States Patent
Hausner et al.

(10) Patent No.: US 7,657,287 B2
(45) Date of Patent: Feb. 2, 2010

(54) MOBILE STATION IN A MOBILE COMMUNICATION SYSTEM AND METHOD FOR ACCESSING A SERVICE AND/OR A DATA RECORD IN THE MOBILE STATION'S STANDBY MODE

(75) Inventors: Josef Hausner, Germering (DE); Dietmar Wenzel, München (DE)

(73) Assignee: Infineon Technologies AG, Munich (DE)

( * ) Notice: Subject to any disclaimer, the term of this patent is extended or adjusted under 35 U.S.C. 154(b) by 1066 days.

(21) Appl. No.: 10/483,561

(22) PCT Filed: Jun. 4, 2002

(86) PCT No.: PCT/DE02/02034

§ 371 (c)(1),
(2), (4) Date: Jul. 15, 2004

(87) PCT Pub. No.: WO03/013170

PCT Pub. Date: Feb. 13, 2003

(65) Prior Publication Data

US 2004/0248550 A1 Dec. 9, 2004

(30) Foreign Application Priority Data

Jul. 20, 2001 (DE) .............................. 101 35 527

(51) Int. Cl.
 H04B 1/38 (2006.01)
 H04M 1/00 (2006.01)
(52) U.S. Cl. ..................... 455/558; 455/550.1; 455/551; 455/556.1
(58) Field of Classification Search .............. 455/550.1, 455/551, 556.1, 55, 558
See application file for complete search history.

(56) References Cited

U.S. PATENT DOCUMENTS 5,146,217 A * 9/1992 Holmes et al. ............. 340/7.55
6,216,014 B1 * 4/2001 Proust et al. ................ 455/558

(Continued)

FOREIGN PATENT DOCUMENTS

DE 197 24 901 A1 12/1998

(Continued)

OTHER PUBLICATIONS

International Search Report for International Application No. PCT/DE02/02034, International Filing Date Jun. 4, 2002, 6 pgs.

*Primary Examiner*—Nay A Maung
*Assistant Examiner*—Tuan H Nguyen
(74) *Attorney, Agent, or Firm*—Eschweiler & Associates, LLC

(57) ABSTRACT

A mobile station is provided comprising a transmission and reception unit and an identification module that can be inserted into the mobile station. The mobile station provides a user, in the standby mode, with services and/or data records that can be retrieved by the user. To prevent unauthorized access to the services and/or data records, each service and/or data record is assigned a characteristic access identifier that is activated or deactivated by inputting and/or transmitting an associated security code. For the purpose of inputting and/or transmitting the security code, the mobile station comprises a security component. Depending on the state of the access identifier, whether activated or deactivated, access to a service and/or data record in the standby mode on the mobile station is disabled or enabled, respectively.

14 Claims, 5 Drawing Sheets

U.S. PATENT DOCUMENTS

| | | | |
|---|---|---|---|
| 6,467,089 B1 * | 10/2002 | Aust et al. | 725/13 |
| 6,741,848 B2 * | 5/2004 | Timonen et al. | 455/405 |
| 6,941,154 B1 * | 9/2005 | Ritter | 455/550.1 |
| 7,137,003 B2 * | 11/2006 | Krishnan et al. | 713/172 |
| 2002/0169989 A1 * | 11/2002 | Chen | 713/202 |
| 2006/0169778 A1 * | 8/2006 | Chung | 235/386 |

FOREIGN PATENT DOCUMENTS

| | | |
|---|---|---|
| DE | 198 28 735 A1 | 12/1999 |
| DE | 299 15 915 U1 | 8/2000 |
| DE | 200 08 345 U1 | 9/2000 |
| DE | 199 19 389 A1 | 11/2000 |
| DE | 100 25 017 A1 | 12/2000 |
| DE | 199 29 251 A1 | 12/2000 |
| EP | 0 579 655 B1 | 3/1997 |
| EP | 0 792 056 A2 | 8/1997 |
| EP | 1 107 623 A2 | 6/2001 |
| EP | 1107623 * | 6/2001 |
| WO | WO 99/24938 | 5/1999 |
| WO | WO 99/44380 | 9/1999 |
| WO | WO 01/08055 A1 | 2/2000 |

* cited by examiner

Figure 2

| Service and/or data record | Access identifier | State of the access identifier | Superordinate access identifier | Associated security code for the access identifier |
|---|---|---|---|---|
| Calendar | 0 | - | - | - |
| Private telephone numbers | 1 | Activated | 3;4 | 01 |
| Business telephone numbers | 2 | Deactivated | 3;4 | 11 |
| Address list | 3 | Activated | - | 2134 |
| e-mail | 4 | Activated | 3 | 225 |
| Internet | 5 | Activated | - | 34 |

Figure 3

| Service and/or data record | Access identifier | State of the access identifier | Superordinate access identifier | Associated security code for the access identifier |
|---|---|---|---|---|
| Private telephone numbers | 1 | Activated | 3;4 | 1815 |
| Business telephone numbers | 2 | Deactivated | 3;4 | 53 |
| Important business telephone numbers | 2 | Deactivated | 4 | 53 |
| Address list | 3 | Activated | 4 | A7 |
| Data record 1 | 4 | Activated | - | Graphical symbol (signature) |
| Appointments | 5 | Activated | 4 | 24 |
| e-mail | 6 | Activated | 7 | ?5? |
| SMS | 7 | Activated | - | Electrical signal |
| Voice recording | 8 | Activated | 7 | Bar code |
| Image recording | 9 | Activated | 8;7 | IMAGE |
| Internet | 10 | Activated | - | Fingerprint |
| Games | 11 | Activated | - | Voice input of the word "GAMES" |

MOBILE STATION IN A MOBILE COMMUNICATION SYSTEM AND METHOD FOR ACCESSING A SERVICE AND/OR A DATA RECORD IN THE MOBILE STATION'S STANDBY MODE

RELATED APPLICATION

This application is a National Stage filing of International Application No. PCT/DE02/02034 filed Jun. 4, 2002, which is entitled "Mobile Station in a Mobile Communication System and Method for Accessing a Service and/or a Data Record in the Mobile Station's Standby Mode", which was not published in English, that claims priority to German Patent Application No. 101 35 527.0 filed on Jul. 20, 2001.

FIELD OF THE INVENTION

The invention relates to a mobile station in a mobile communication system and to a method for accessing a service and/or a data record in the mobile station's standby mode.

BACKGROUND OF THE INVENTION

A mobile station, which usually comprises a transceiver and an identification module, normally stores personal, user-related data records from a wide variety of data categories (for example telephone numbers, addresses, appointments, texts and voice recordings). In addition, services (for example Internet, e-mail) are provided. When the mobile station is in the off state, the data records and services are generally protected against unauthorized access and unauthorized use, and also unauthorized call setup is stopped, since the prior art usually requires a personal identification number (PIN) to be input into the mobile station by the user using the keypad in order to turn on the mobile station and to activate its standby mode. It is thus usual practice on mobile telephones, for example, for startup of these appliances to be followed by a request for an ordinarily four-digit PIN, whose correct input is absolutely necessary in order to register in the network operator's network. This ensures that mobile telephones which are off hold no incentive for thieves because it is not possible to use them without prior PIN input.

Even if this protection function on mobile telephones which are not continuously carried by the users has authorization for these users, it is to some extent perceived as onerous to individualize authorized use by inputting the PIN in order to put the mobile telephone into the standby state first. The PIN therefore affords the protection that a mobile station is either protected only in the off state or is generally available in the standby state. This means that there is the risk of unauthorized use or theft particularly when the mobile station is in the standby state and is left unattended by the authorized user.

If the mobile station is in the standby mode, i.e. it is possible either for a call to the base station to be initiated by the mobile station or for the mobile station to receive a call initiated by the base station, there has previously been no possibility of person-related protection of the data or services provided via the mobile station.

In the case of one known apparatus (DE 299 15 915 U1), access to a service and/or a data record in the mobile station's standby mode is protected by virtue of the mobile station having a built-in transmitter with a mini-receiver. The built-in transmitter operates on a radio basis and in no way impairs the mobile telephone's operation while the mini-receiver is in the reception range. In this case, the mini-receiver is located on the mobile telephone owner's set of keys. If the owner now moves more than two to five meters away from his mobile telephone, the mini-receiver immediately gives an audible and visual alarm, and at the same instant the mobile telephone's keypad is locked. When the mobile telephone owner comes back into the transmission range, the keypad is immediately unlocked and is available again. To deactive the security system, the mini-receiver is turned off, and although this locks the keypad it is possible to use a code number (which is available to every mobile telephone) to unlock the keypad again.

The keypad lock usually implemented, which is known from the prior art in quite a few embodiments, is not a person-related means of protection, but rather just an, at best, appliance-specific mechanism for protecting against unintentional keypad operation.

Often, the mobile station is operated in the standby state for a relatively long time and is kept at locations which are accessible to a plurality of persons. Particularly in such situations or when the mobile station has been stolen in the standby state, it is useful to protect against misuse and unauthorized access to services and/or data records.

SUMMARY OF THE INVENTION

It is an object of the invention to provide a mobile station in a mobile communication system and a method for accessing a service and/or a data record which is provided for a user via the mobile station and can be retrieved by the user where it is possible to prevent unauthorized use of the service and/or the data record in the mobile station's standby mode with a high degree of certainty.

A mobile station in a mobile communication system has a transmission and reception unit for transmitting electrical signals between the mobile station and one or more further mobile stations via one or more base stations or between the mobile station and one or more base stations. In addition, the mobile station has an identification module (SIM) which can be inserted into the mobile station for the purpose of checking a user's authorization to use the mobile station and for the purpose of activating the mobile station's standby mode, said mobile station providing at least one service and/or data record which can be retrieved by a user.

In line with the invention, the service and/or data record provided has an associated characteristic access identifier. In this case, the access identifier is protected by an individual security code. To this end, the mobile station has a security means which is active at least in the mobile station's standby mode. By inputting and/or transmitting the security code into and/or to the security means, it is possible to activate or deactivate the access identifier. By virtue of the access identifier having been activated or deactivated, access to the service and/or to the data record is disabled or enabled.

This makes it possible to achieve a situation in which access to the service and/or data record provided via the mobile station is prevented for an unauthorized user. This means that the mobile station is also protected against unauthorized access in the standby mode when it is unattended by the authorized user.

Advantageous refinements of the invention are specified in the subclaims.

In this case, provision can be made for the access identifier to have one or more numbers and/or one or more letters and/or one or more special characters.

As a result, it is possible to achieve the situation in which a multiplicity of combinations of characters, letters and special characters are possible for the access identifier, and hence increased protection against unauthorized access to a service and/or data record is ensured.

In addition, provision can be made for the security code to be the same as a PIN code which is input in order to activate the mobile station's standby mode. Alternatively, the security code can be in a form such that the code has one or more alphanumeric characters and thus comprises at least one letter or at least one digit. Another embodiment involves the security code having one or more graphical characters and/or one or more graphical symbols.

This provides the user with a multiplicity of combination options for the security code and it is possible to ensure that the security code is in as simple a form as possible. In addition, this makes it possible to reduce the likelihood of an unauthorized user finding out the security code by means of simple trial.

Besides these embodiments of the security code, another alternative is to use a biometric feature of an authorized user of the mobile station as a security code. In this case, the biometric feature used can be a fingerprint, for example. Alternatively, the image of the authorized user's eye can be used as a biometric characteristic.

Alternatively, the security code can be an audio feature of the authorized user, for example the spoken voice.

As a result, it is possible to achieve a situation in which the security code is characterized by an individual feature of the authorized user. Another advantage in this context is that the biometric feature is input and checked relatively quickly and that there is no requirement for the authorized user to remember one or more combinations of characters, digits, letters and the like.

Another possibility for the form of the security code is for the security code to be an electrical signal which is transmitted wirelessly to the mobile station.

Provision can also be made for the security code to be in the form of a barcode or a magnetic code, for example on a chip card.

This likewise provides the option of relatively fast input or transmission of the security code to the mobile station, and also provides a high level of protection for the services and/or data records against unauthorized use.

It goes without saying that it is also readily possible to produce a security code in such a way that it represents any desired combination of the embodiments cited above.

Depending on the desired protection of access to services and/or data records, it is thus possible to reduce the likelihood of unauthorized access further.

Depending on the form of the security code, the mobile station has appropriate security means for inputting and/or transmitting the security codes into and/or to the mobile station. For the purpose of inputting the security codes, provision can be made in this case for the mobile station to have a keypad and/or a touch-sensitive display panel, for example a touchscreen or a touchpad, in addition, there can be a sensor for detecting biometric or audio features of the authorized user.

For the purpose of transmitting the security code which is in the form of an electrical signal, there can be a portable transponder which, when operated by the authorized user, transmits the electrical signal, which can be received by a corresponding receiver in the mobile station and can have its authorization checked.

The mobile station can also have a scanner apparatus which is used to scan the security code which is in the form of a barcode or magnetic code on a chip card. In this case, the scanner apparatus can be arranged in the mobile station or can be connected to the mobile station by means of an electrical connection.

If the mobile station is used to provide a user with a plurality of services and/or data records, provision can advantageously be made for an access identifier to be assigned to a plurality of services and/or data records. It is also possible for each service and/or data record to have a plurality of associated access identifiers in accordance with a hierarchic structure. Both the association and the form of the hierarchic structure can be individually altered at least to some extent by an authorized user in this case.

This makes it possible to achieve a situation in which the authorized user can protect the services and/or data records on the basis of his individual priority list for the importance of protecting against unauthorized access to the services and/or data records.

Advantageously, the mobile station has a timer which, after the expiry of a stipulatable period of time within which no services and/or data records are requested by a user in the mobile station's standby mode, automatically activates access codes. In this case, the access codes to be automatically activated can likewise be stipulated by the authorized user in advance.

This means that it is possible to prevent unauthorized access even if an authorized user forgets to protect particular services and/or data records explicitly in the mobile station's standby mode.

In this context, all access identifiers and associated security codes input by the user can be stored, or stored in encrypted form, in the mobile station and/or in the mobile station's identification module (SIM). This makes it possible to achieve a situation in which an association, set by the authorized user, between the access identifiers and security codes exists until it is altered by the authorized user. The settings are therefore also retained when the mobile station is in the off state.

Regardless of how many services and/or data records provided for a user in the mobile station's standby mode are disabled as a result of activated access identifiers, it is possible for incoming connections to be received and accepted by a user.

BRIEF DESCRIPTION OF THE DRAWINGS

Exemplary embodiments of the invention are explained in more detail below with reference to the schematic drawings, in which:

FIG. 2 shows an illustration of an association between services and/or data records and characteristic access identifiers and security codes, FIG. 3 shows another exemplary embodiment of an association between services and/or data records and characteristic access identifiers and security codes.

DETAILED DESCRIPTION OF THE INVENTION

Figure 1:
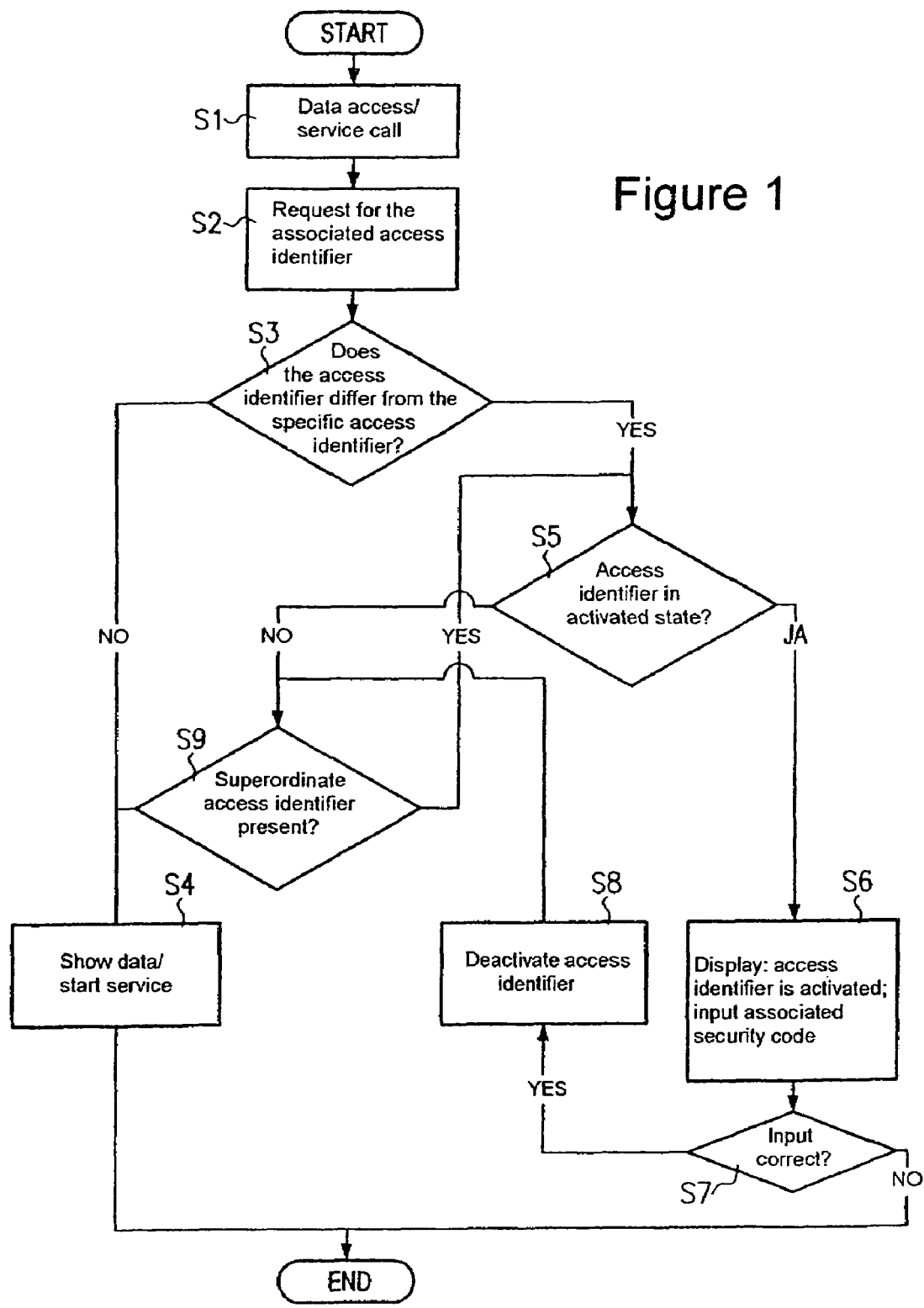
FIG. 1 shows a sequence for a method in accordance with the invention.

An inventive method for accessing a service and/or a data record which are provided for a user in a mobile station's standby mode is started by virtue of a user of the mobile station attempting to retrieve a service and/or data record in method step S1 (FIG. 1). In this case, the mobile station's standby mode is understood to mean the operating state which the mobile station assumes when the user has been correctly identified, for example as a result of the input of a personal identification number (PIN), and the services and/or data records are provided via the mobile station.

By virtue of the user attempting to start or request a service and/or data record, approval of the access is preceded by a request for a characteristic access identifier, associated with this service and/or this data record, in method step S2. In this case, the characteristic access identifier is assigned to the service and/or data record by the authorized user. A single access identifier can also be assigned to a plurality of different services and/or data records, as a result of which group formation is possible. The association can be made at any time during the mobile station's standby mode and is stored in an identification module (SIM) and/or in the mobile station. An association which an authorized user has set between the characteristic access identifiers and the services and/or data records also remains stored when the mobile station is in the off state, and it is not altered until the authorized user makes a new association between the access identifiers and the services and/or data records.

Requesting the access identifier involves first checking whether the associated characteristic access identifier corresponds to a specific access identifier in method step S3. This specific access identifier is assigned in advance, by virtue of input into the mobile station by an authorized user, to all those services and/or data records whose content or whose use can also be accessible to an unauthorized user. In this case, this specific access identifier is put neither into an activated nor into a deactivated state. The specific access identifier is therefore also not assigned an individual security code used for activating or deactivating the specific access identifier.

If it is recognized that the service and/or data record has this specific access identifier associated with it, then the service and/or the data record immediately becomes accessible to the user without any further security check, in method step S4.

If an access identifier is recognized to differ from the specific access identifier, however, then there is a subsequent check to determine the state, whether activated or deactivated, of this access identifier (method step S5). Apart from the specific access identifier, all characteristic access identifiers associated with the respective services and/or data records are put either into the activated or into the deactivated state.

If the characteristic access identifier is in the activated state, then access to the service and/or data record is prevented. In method step S6, a user is asked to input a security code into the mobile station or to transmit one to the mobile station. In this case, this security code is specifically associated with this characteristic access identifier. Only when the security code associated with this access identifier is correctly input into the mobile station or transmitted to the mobile station is the access identifier deactivated. If an incorrect security code is input in method step S7, checking of the security code is aborted and access to the corresponding service and/or data record is prevented.

Provision can be made for incorrect or wrong input to prompt a fresh request to the user to input the correct security code, and for checking of the security code to be aborted only in the event or two more incorrect inputs and/or transmissions.

Once the security code has been correctly input into the mobile station or transmitted to the mobile station, the characteristic access identifier is deactivated in method step S8 and access to the service and/or data record is enabled.

In step S9 in FIG. 1, provision can also be made for deactivation of the characteristic access identifier to be followed by a further check to determine whether there is a further access identifier associated with the service and/or data record and whether this access identifier is superordinate to the first, already deactivated access identifier.

If no further access identifier is recognized, then access to the service and/or data record which is already associated with the deactivated access identifier is enabled in step S4. If there is a further access identifier which is superordinate to the first already deactivated access identifier, however, then method step S5 again checks whether this superordinate access order is activated or deactivated. The subsequent steps are carried out in a similar manner to the method steps which have already been carried out.

The assignment of a plurality of access identifiers to a service and/or data record in accordance with a hierarchic structure is not subject to any limitation in terms of number.

FIG. 2 subsequently illustrates a table for a first exemplary embodiment of an assignment of access identifiers and security codes to corresponding services and/or data records. In this case, the services provided are Internet and e-mail, for example. By way of example, data records are provided for the authorized user in the form of a private telephone number list and a business telephone number list, an address list and a calendar. If a user wishes to retrieve the data record for the calendar in the mobile station's standby mode, then there is first a check to determine whether this data record has the specific access identifier associated with it. In the exemplary embodiment, the specific access identifier has been implemented with the digit 0. It is now recognized that the data record for the calendar has 0 associated with it as access identifier.

This means that the calendar has been enabled for any user and can be retrieved by any user, even by an unauthorized user. Since the specific access identifiers is not in an activated or deactivated state, there is also no associated individual security code which could be used to activate or deactivate the specific access identifier. In addition, the access identifier 0 has no other superordinate access identifier whose state would need to be requested. Hence, the calendar is immediately accessible to any user in the mobile station's standby mode and can be retrieved. If a user also wishes to access the data record for the private telephone numbers, then the access identifier 1 associated with this data record is recognized first of all. Since this access identifier is different than the specific access identifier 0, the state of the access identifier 1 is checked.

In the exemplary embodiment, the access identifier 1 is in the activated state. The user is now asked to input the associated individual security code 01, for example using a keypad or a touch-sensitive display panel. Upon correct input, the access identifier 1 is put into the deactivated state. Next, there is a check to determine whether there is a further access identifier which is superordinate to the access identifier 1. In this case, it is recognized that both the access identifier 3 and the access identifier 4 are superordinate to the access identifier 1. A check is now carried out to determine which state the access identifiers 3 and 4 are in. Both the access identifier 3 and the access identifier 4 are in the activated state. Again, the user is asked to input the respectively associated security codes. Inputting the security code 2134 deactivates the access identifier 3, and inputting the security code 225 deactivates the access identifier 4. Provided that the two security codes for the access identifiers 3 and 4 have been input correctly, access to the data record for the private telephone numbers is now enabled.

If a user wishes to access the data record for the business telephone numbers, then first the associated access identifier 2 is recognized. This access identifier 2 is in the deactivated state, which means that the user is not asked to input the assured security code 11, since it is not necessary to deactivate the access identifier 2. However, as in the case of the data record for the private telephone numbers, the access identifiers 3 and 4 are again superordinate. As in the case of the data record for the private telephone numbers, it is now first necessary to deactivate these two access identifiers 3 and 4 in order to enable access to the data record for the business telephone numbers. In line with the illustrated association table, access to the address list requires deactivation of the associated access identifier 3. This requires input of the associated security code 2134.

In the exemplary embodiment, the access identifier 3 has no associated further access identifier. To access the e-mail service, the associated access identifier 4 is deactivated by inputting the associated security code 225. Since the access identifier 3 is superordinate to the access identifier 4, and said access identifier 3 has likewise been activated, it is likewise necessary to deactivate the access identifier 3 by inputting the security code 2134 into the mobile station in order to enable access to the e-mail service. In the exemplary embodiment, access to the Internet service is possible immediately. The associated access identifier 5 has been deactivated, and also there is no further access identifier which is superordinate to it.

In this exemplary embodiment, both the characteristic access identifiers and the superordinate access identifiers and also the individual security codes are in the form of digits or digit combinations. Provision can also be made for the characteristic access identifiers, the superordinate access identifiers and also the security codes to be exclusively in the form of special characters or special character combinations or exclusively in the form of letters or letter combinations or exclusively in the form of graphical characters and/or symbols or in the form of combinations of graphical characters and/or symbols.

Another exemplary embodiment of an assignment of access identifiers and security identifiers to services and/or data records is illustrated in the table in FIG. 3. In this case, the services and/or data records provided via the mobile station are, by way of example, a list containing private telephone numbers, a list containing business telephone numbers, a list containing important business telephone numbers, an address list, a data record combining all the aforementioned lists, an appointments list, an e-mail service, an SMS (Short Message Service) service, a voice recording service, an image recording service, an Internet service and also games.

The access identifiers are again in the form of digits and are associated with the respective services and/or data records. If a user tries to access the list of private telephone numbers, it is recognized that there is an associated access identifier 1 which is different than the specific access identifier 0. The access identifier 1 has been activated and the user is asked to input the associated security code 1815 using the keypad and/or the touch-sensitive display panel. Following correct input, the access identifier 1 is deactivated and a check is carried out to determine whether, and if so which, access identifiers are superordinate to the access identifier 1. In this case, it is recognized that the access identifiers 3 and 4 are superordinate to the access identifier 1. Hence, the state of these two access identifiers 3 and 4 is subsequently checked and it is established that both access identifiers have been activated. Again, the user is asked to input the individual security codes which are respectively associated with these access identifiers 3 and 4. In this case, the security code which is associated with the access identifier 3 is in the form of a digit and letter combination A7 and is input using the keypad and/or the touch-sensitive display panel. The access identifier four has been protected by a graphical symbol which is likewise input into the mobile station using the keypad or the touch-sensitive display panel. The graphical symbol can also be in the form of handwriting, for example a signature of the authorized user or a polygon written using a stylus on the touch-sensitive display panel. If the security codes of the access identifiers 3 and 4 have now been input correctly, then these two access identifiers 3 and 4 are deactivated and access to the private telephone number list is enabled.

When the data record for the business telephone number list is accessed, it is recognized that the access identifier 2 is associated and said access identifier 2 is in the deactivated state. Deactivation by inputting the security code 53 is therefore not necessary. However, the access identifier 2 has superordinate access identifiers 3 and 4, which means that, in this case too, it is again necessary to deactivate the two access identifiers 3 and 4 by inputting the associated security codes so that access to the data record for the business telephone numbers is enabled. In addition, in the exemplary embodiment, the data record for the important business telephone numbers likewise has the associated access identifier 2. If a user wishes to access the data record, then, as can be seen from the table in FIG. 3, it is necessary to deactivate the superordinate access identifier 4 by inputting the graphical symbol. Similarly, access to the data record for the address list involves checking the access identifier. The associated access identifier 3 is recognized and is deactivated by correctly inputting the associated security code A7. This means that access to the data record for the address list has been enabled.

If a user accesses the data denoted in the table by data record 1, then the associated access identifier 4 is first recognized in the activated state. As a result of input of the associated security code, which is in the form of a graphical symbol, access to the data record is enabled. Since the data record 1 covers the data records for the private telephone numbers, for the business telephone numbers, for the important business telephone numbers, the address list and also the appointments list, it also becomes automatically possible to access these data records for as long as the access identifier is associated with these data records have been deactivated. In the exemplary embodiment, enabling access to the data record 1 merely enables access to the data record for the important business telephone number list. This is because only this data record has an associated access identifier, namely the access identifier 2 which has been deactivated.

All the other data records covered in the data record 1 have a further superordinate access identifier, which has been activated (business telephone number list with activated superordinate access identifier 3, private telephone number list with activated superordinate access identifier 3) or have an access identifier which is associated with the data record and which has been activated (private telephone number list with activated access identifier 1, address list with activated access identifier 3, appointments with activated access identifier 5).

When the user accesses the data record for appointments, it is recognized that the associated access identifier 5 has been activated. Inputting the security code 24 deactivates this access identifier 5, and access to the data record for appointments is not enabled until the access identifier 4 for the data record 1 is also deactivated.

If a user wishes to use the e-mail services, then the associated access identifier 6 is checked and the activated state of this access identifier 6 is recognized. After the user is asked to input the associated security code and the user correctly inputs the combination ?5?, there is also a check to determine which access identifiers are superordinate to this access identifier 6. In this case, it is recognized that the associated superordinate access identifier is the access identifier 7. This access identifier is associated with the SMS service and is in the activated state. This access identifier 7 has an associated electrical signal as security code, said electrical signal being transmitted wirelessly from a portable transponder to a receiver in the mobile station. Operating the transponder transmits the electrical signal to the receiver. Once the signal has been received correctly, the access identifier 7 is deactivated and the user can access the e-mail service. At the same time, the user can now also access the SMS service, because the access identifier 7, which is associated with the SMS service as a characteristic access identifier, has no further superordinate access identifier.

When the voice recording service is used by the user, there is again, as in the case of all the other initial checks, first a check to determine whether the service has the specific access identifier associated with it. In the exemplary embodiment, the specific access identifier 0 is not assigned in the case of the voice recording service either. The voice recording service is assigned the access identifier 8, which is recognized in the activated state. Scanning a barcode using a scanner apparatus deactivates the access identifier 8. In this case, provision can be made for the scanner apparatus to be arranged in the mobile station or to be arranged externally and to be connected to the mobile station by means of an electrical connection. If the barcode is recognized as being correct, the access identifier 8 is deactivated. Transmitting the electrical signal to a receiver arranged in the mobile station using the transponder allows the access identifier 7, which is superordinate to the access identifier 8, to be deactivated and the user can use the now enabled voice recording service.

The image recording service has the characteristic access identifier 9 associated with it, said access identifier 9 likewise being in the activated state. Inputting the word "IMAGE" using the keypad or the touch-sensitive display panel deactivates the access identifier 9. In addition, the access identifiers 7 and 8, which are superordinate to the access identifier 9, can be deactivated in line with the procedure already outlined above. If the access identifiers 9, 7 and 8 are deactivated correctly, access to the image recording service is enabled.

If a user wishes to set up access to the Internet, then first the access identifier 10 associated with this service is recognized. The access identifier 10, which is in the activated state, is protected by the biometric characteristic of the authorized user's fingerprint. By virtue of the user placing his fingers onto a fingerprint sensor's contact surface provided for this purpose, this fingerprint is checked and the access identifier 10 is deactivated if authorization exists. The user can access the Internet service.

The last service provided for the user in the exemplary embodiment is the opportunity to use games. The associated characteristic access identifier 11 is in the activated state and can be deactivated by a voice input from the authorized user, for example the word "Games". In this case, the security code deactivated using a sensor can be the word itself and/or a characteristic audio feature of the voice of the authorized user. If authorization is substantiated, the access identifier 11 is deactivated and access to the games is enabled.

In a second exemplary embodiment too, it is possible to combine the respective access identifier as a combination of special characters and/or letters and/or graphical characters and/or symbols and/or digits.

In both exemplary embodiments, the digit 0 has been chosen for the specific access identifier. Alternatively, any other digit or combination of digits and/or letters and/or special characters and/or graphical characters and/or symbols can be provided for the specific access identifier.

It is likewise possible for all the services and/or data records to be assigned a superordinate access identifier and for deactivation of this superordinate access identifier to allow access to all the provided services and/or data records. However, this is possible only if the characteristic access identifiers which are individually associated with the respective services and/or data records have been deactivated.

Figure 4:
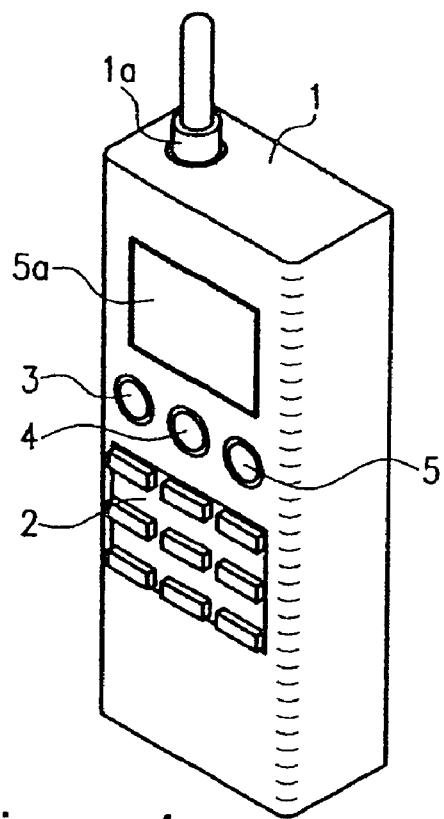
FIG. 4 shows a mobile station with a keypad and a display.

FIG. 4 shows a mobile station 1 which has a keypad 2 and also touch-sensitive display panels 3, 4, 5 and 5a. By manually operating the keys on the keypad 2 and/or the touch-sensitive display panels 3, 4, 5 and 5a using a finger or a stylus, it is possible to input the corresponding security code.

Figure 5:
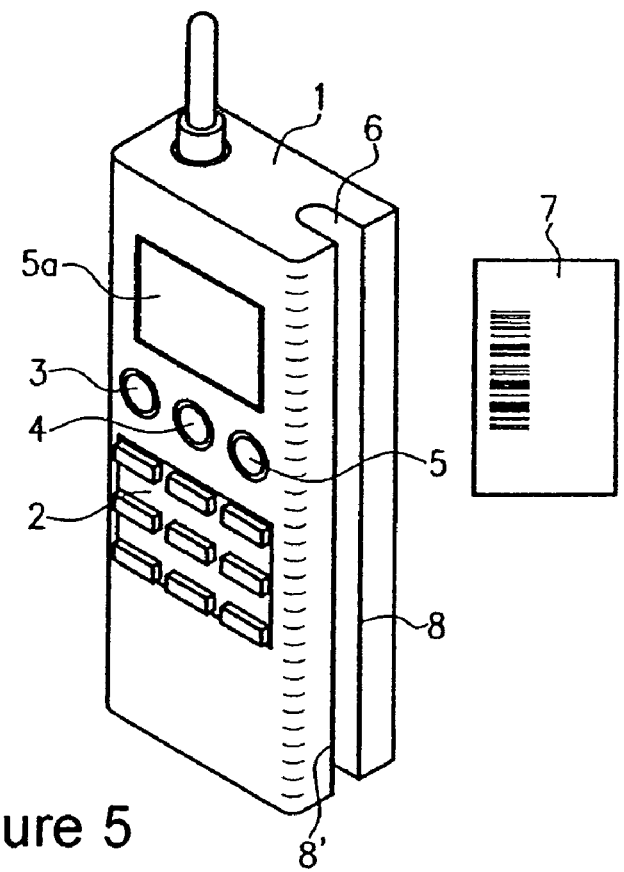
FIG. 5 shows a mobile station with a scanner apparatus.

FIG. 5 shows another exemplary embodiment of the mobile station 1. In this case, the mobile station 1 additionally has a scanner apparatus 6. This allows a barcode or a magnetic code on a chip card 7 to be scanned when a user sees the chip card through the guide 8 and 8' of the scanner apparatus 6. In the exemplary embodiment, the scanner apparatus 6 is arranged on the longitudinal side of the mobile station 1, but can also be arranged on the short side of the mobile station 1 or at another location. The mobile station 1 can also be in a form such that it has only the scanner apparatus 6 and no keypad 2 and/or no touch-sensitive display panels 3, 4, 5 and 5a.

Figure 6:
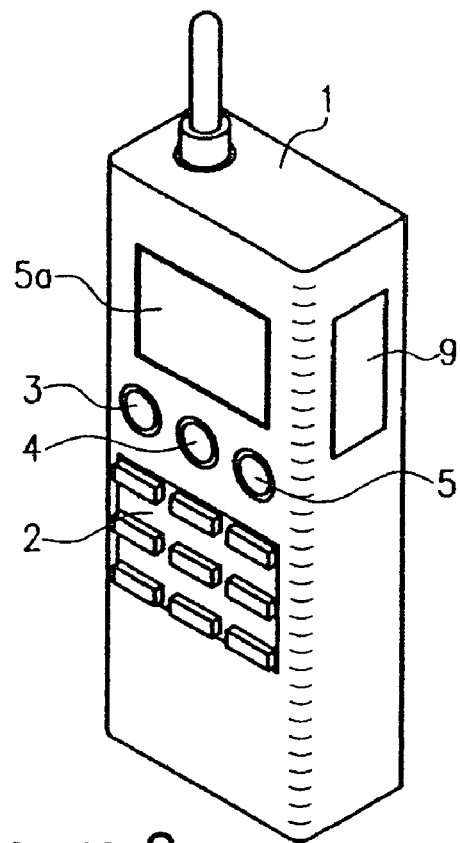
FIG. 6 shows a mobile station with a sensor for detecting a user's fingerprint.

FIG. 6 shows a mobile station 1 as shown in FIG. 1, said mobile station 1 additionally having a fingerprint sensor 9. In this case, the fingerprint sensor 9 can be arranged on the back or else on the front side or else on the narrow sides of the mobile station 1. Similarly, provision can also be made in this case for the mobile station 1 to be implemented just with the fingerprint sensor 9 and without the keypad 2 and/or the touch-sensitive display panels 3, 4, 5 and 5a.

Figure 7:
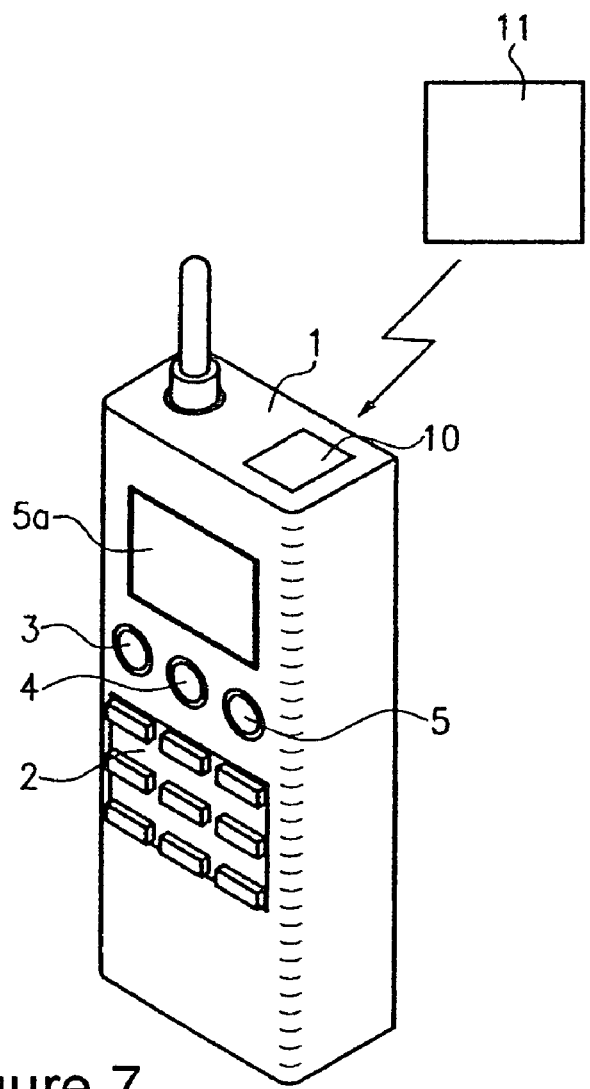
FIG. 7 shows a mobile station with a receiver for electrical signals and a portable transponder.

Another exemplary embodiment of the mobile station is shown in FIG. 7. This mobile station 1 has a receiver 10 which can be used for wirelessly receiving transmitted electrical signals from a portable transponder 11.

Figure 8:
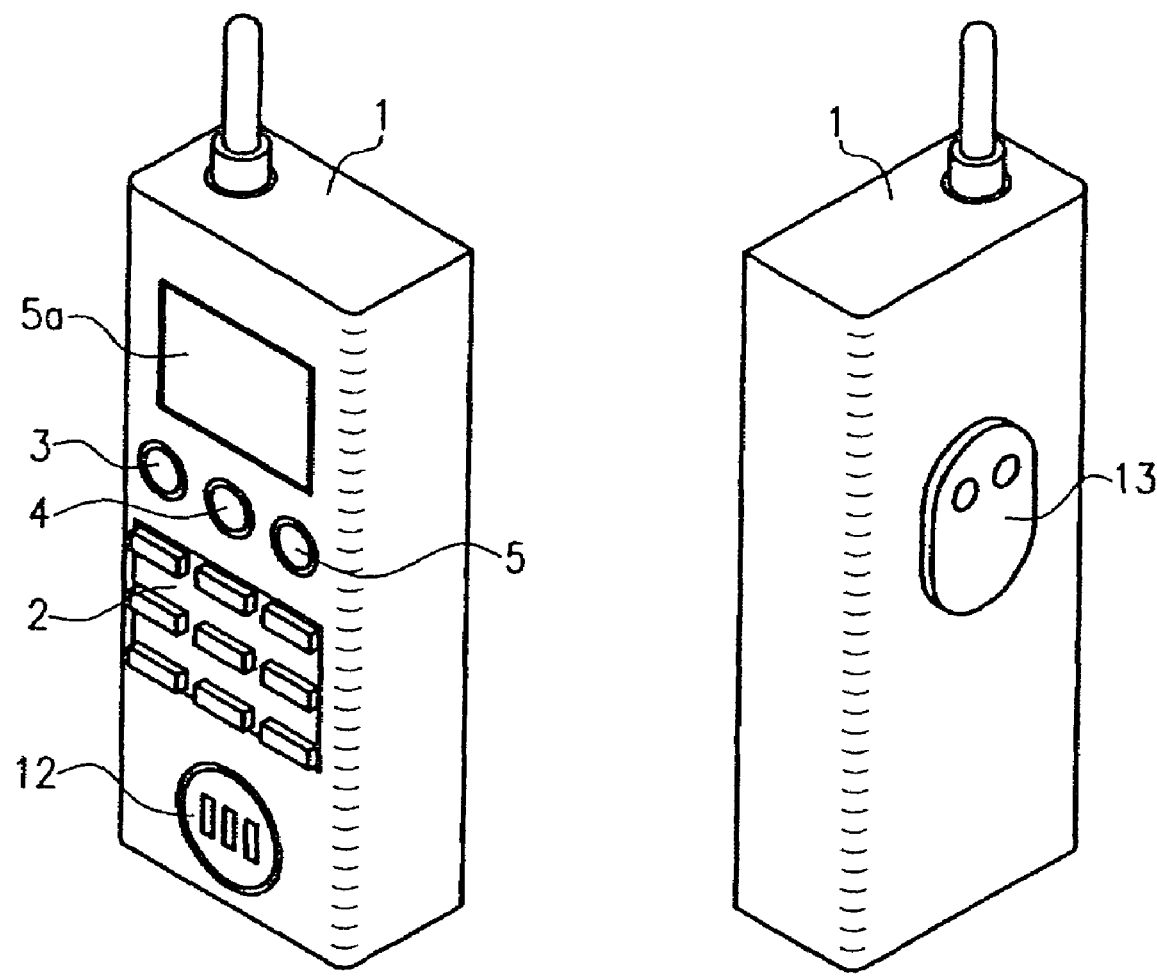
FIG. 8 shows a mobile station with a sensor for detecting a user's eye image and a sensor for recording voice signals from a user.

In addition to the keypad 2 and the touch-sensitive display panels 3, 4, 5 and 5a, the mobile station 1 as shown in FIG. 8 also has a sensor 12 which is used to detect voice signals spoken by a user. In addition, the mobile station 1 also has a second sensor 13, which can be used to detect the image of the user's eye and which is arranged on the back of the mobile station 1, for example.

In all the exemplary embodiments of the mobile station 1 in FIGS. 4 to 8, it is possible for the mobile station 1 both to have just one respective means for inputting and/or transmitting the security code and to have any combination of the means shown for inputting and/or transmitting the security code.

A mobile station is understood, by way of example, to mean a mobile telephone, a car telephone, a satellite telephone or a satellite fax.

The services and data records listed are to be regarded as examples and can be extended or replaced by any services and/or data records which can be provided for a user via the mobile station.

The invention claimed is:

1. A mobile station in a mobile communication system, comprising:
   a transmission and reception unit adapted to interchange signals with one or more additional mobile stations or a plurality of base stations;
   an identification module selectively inserted into the mobile station and configured to check use authorization for the mobile station, and to activate a standby mode to allow an attempt to access data records on the mobile station based on the affirmative use authorization check;
   wherein at least one service or data record has a characteristic access identifier associated therewith, and wherein the service or record is available to a user via the mobile station in the standby mode and is retrievable by the user via the characteristic access identifier;
   wherein the characteristic access identifier is protected with an individual security code, and wherein the characteristic access identifier is assignable to a plurality of services or data records, and
   wherein the mobile station comprises at least one security component into which the security code is input or transmitted in order to activate or deactivate the characteristic access identifier to disable or enable access to the service or data record,
   wherein the security code comprises one or more of a code comprising one or more graphical symbols or one or more graphical characters, a biometric feature of an authorized user, an audio feature of an authorized user, a wirelessly transmitted electrical signal, or a bar code or magnetic code on an identification card or chip card.

2. The mobile station of claim 1, wherein the characteristic access identifier comprises one or more numbers, one or more letters, or one or more special characters, or a combination thereof.

3. The mobile station of claim 1, wherein the security code for activating the characteristic access identifier and the security code for deactivating the characteristic access identifier are different.

4. The mobile station of claim 1, wherein the characteristic access identifier is associated with a plurality of services or data records.

5. The mobile station of claim 1, wherein each service or data record comprises a plurality of associated characteristic access identifiers in accordance with a hierarchic structure.

6. The mobile station of claim 1, further comprising a superordinate access identifier associated with the service or data, wherein an association between the characteristic access identifier or the superordinate access identifier and the service or data record is alterable by an authorized user.

7. The mobile station of claim 1, wherein the characteristic access identifier and security code associated with the service or data record are stored in standard or encrypted form in the mobile station or in the identification module.

8. The mobile station of claim 1, wherein calls arriving when at least one characteristic access identifier has been activated are received in the standby mode on the mobile station.

9. A mobile station in a mobile communication system, comprising:
   a transmission and reception unit adapted to interchange signals with one or more additional mobile stations or a plurality of base stations;
   an identification module selectively inserted into the mobile station and configured to check use authorization for the mobile station, and to activate a standby mode to allow an attempt to access data records on the mobile station based on the affirmative use authorization check;
   wherein at least one service or data record has a characteristic access identifier associated therewith, and wherein the service or record is available to a user via the mobile station in the standby mode and is retrievable by the user via the characteristic access identifier;
   wherein the characteristic access identifier is protected with an individual security code, and wherein the characteristic access identifier is assignable to a plurality of services or data records, and
   wherein the mobile station comprises at least one security component into which the security code is input or transmitted in order to activate or deactivate the characteristic access identifier to disable or enable access to the service or data record,
   wherein the security component comprises one or more of a keypad, a touch-sensitive display panel, a biometric sensor, a sensor for detecting an audio signal, a portable transponder and receiver, or a scanner apparatus.

10. A mobile station in a mobile communication system, comprising:
    a transmission and reception unit adapted to interchange signals with one or more additional mobile stations or a plurality of base stations;
    an identification module selectively inserted into the mobile station and configured to check use authorization for the mobile station, and to activate a standby mode to allow an attempt to access data records on the mobile station based on the affirmative use authorization check;
    wherein at least one service or data record has a characteristic access identifier associated therewith, and wherein the service or record is available to a user via the mobile station in the standby mode and is retrievable by the user via the characteristic access identifier;
    wherein the characteristic access identifier is protected with an individual security code, and wherein the characteristic access identifier is assignable to a plurality of services or data records,
    wherein the mobile station comprises at least one security component into which the security code is input or transmitted in order to activate or deactivate the characteristic access identifier to disable or enable access to the service or data record; and
    a timer which, after the expiry of a predetermined period of time within which no services or data records are requested by a user in the mobile station's standby mode, automatically activates one or more security codes, wherein the security codes are stipulated by an authorized user.

11. A mobile station in a mobile communication system, comprising:
    a transmission and reception unit adapted to interchange signals with one or more additional mobile stations or a plurality of base stations;
    an identification module selectively inserted into the mobile station and configured to check use authorization for the mobile station, and to activate a standby mode to allow an attempt to access data records on the mobile station based on the affirmative use authorization check;
    wherein at least one service or data record has a characteristic access identifier associated therewith, and wherein the service or record is available to a user via the mobile station in the standby mode and is retrievable by the user via the characteristic access identifier;

wherein the characteristic access identifier is protected with an individual security code, and wherein the characteristic access identifier is assignable to a plurality of services or data records, and wherein the mobile station comprises at least one security component into which the security code is input or transmitted in order to activate or deactivate the characteristic access identifier to disable or enable access to the service or data record, wherein the service comprises one or more of Internet access, or games.

12. A mobile station in a mobile communication system, comprising:

a transmission and reception unit adapted to interchange signals with one or more additional mobile stations or a plurality of base stations;

an identification module selectively inserted into the mobile station and configured to check use authorization for the mobile station, and to activate a standby mode to allow an attempt to access data records on the mobile station based on the affirmative use authorization check;

wherein at least one service or data record has a characteristic access identifier associated therewith, and wherein the service or record is available to a user via the mobile station in the standby mode and is retrievable by the user via the characteristic access identifier;

wherein the characteristic access identifier is protected with an individual security code, and wherein the characteristic access identifier is assignable to a plurality of services or data records, and wherein the mobile station comprises at least one security component into which the security code is input or transmitted in order to activate or deactivate the characteristic access identifier to disable or enable access to the service or data record, wherein the data record comprises one or more of a voice recording, an image recording, Internet content, or WAP (Wireless Access Protocol) content.

13. A mobile station in a mobile communication system, comprising:

a transmission and reception unit adapted to interchange signals with one or more additional mobile stations or a plurality of base stations;

an identification module selectively inserted into the mobile station and configured to check use authorization for the mobile station, and to activate a standby mode on the mobile station;

wherein at least one service or data record has a non-descriptive characteristic access identifier associated therewith, and wherein the service or record is available to a user via the mobile station in the standby mode and is retrievable by the user via the non-descriptive characteristic access identifier;

wherein the non-descriptive characteristic access identifier is protected with an individual security code, and wherein the mobile station comprises at least one security component into which the security code is input or transmitted in order to activate or deactivate the non-descriptive characteristic access identifier to disable or enable access to the service or data record.

14. The mobile station of claim 13, wherein the non-descriptive access identifier associated with at least two differing service or data records are different from one another.

* * * * *